Nov. 28, 1933.　　　F. H. SMITH　　　1,937,170

VEHICLE JACK

Filed Dec. 13, 1932　　　2 Sheets-Sheet 1

INVENTOR
Frederick H. Smith
BY
Popp and Powers
ATTORNEYS

Nov. 28, 1933.  F. H. SMITH  1,937,170
VEHICLE JACK
Filed Dec. 13, 1932   2 Sheets-Sheet 2
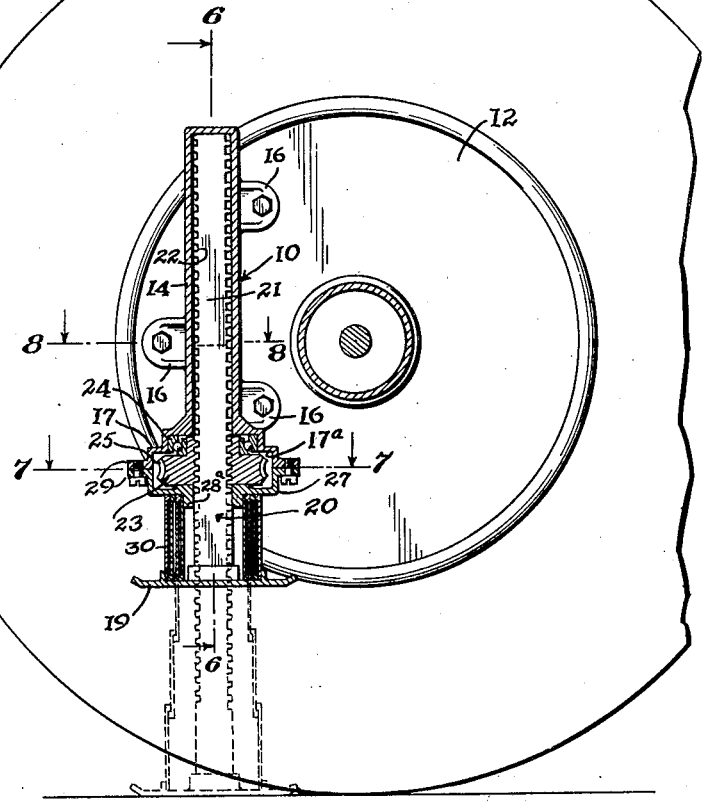
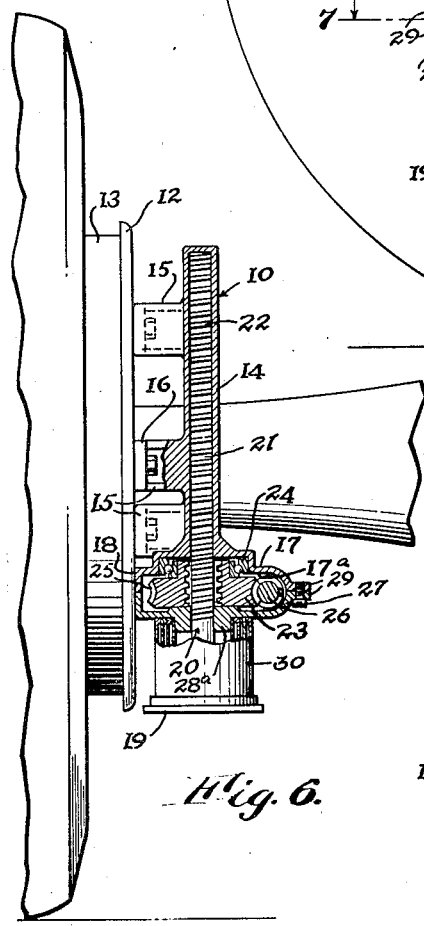
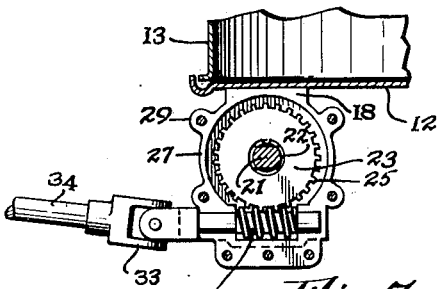
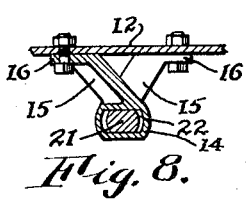
INVENTOR
Frederick H. Smith
BY
Popp and Powers
ATTORNEYS Patented Nov. 28, 1933

1,937,170

UNITED STATES PATENT OFFICE 1,937,170

VEHICLE JACK

Frederick H. Smith, Orchard Park, N. Y., assignor of forty-nine one-hundredths to William A. Martin, Orchard Park, N. Y.

Application December 13, 1932
Serial No. 647,004

7 Claims. (Cl. 254—86)

This invention relates to improvements in vehicle jacks and more particularly the invention is concerned with a jack of the kind which is permanently attached to the vehicle in such relation to a wheel thereof that the latter may be lifted as occasion may require by the operation of the jack in its attached position.

One object of the invention is to provide a jack of the kind generally described which may be applied to vehicles of conventional construction without requiring modification of the design thereof.

A further object is to provide a jack which is designed in such a manner that when attached to a vehicle it is held securely in its attached position.

A still further object is to provide a construction wherein the jack is so located that when inoperative it is supported at such a height that the possibility of its encountering obstructions in the road is minimized.

A still further object is to provide a construction in which the operating mechanism is protected against dirt and water.

A still further object is to provide a novel form of jack whereby economy and simplicity in construction are obtained.

The invention is illustrated in the accompanying drawings, in which:

Figure 5 is an enlarged view of a rear wheel of the vehicle showing the jack in section.

Figure 6 is a sectional view taken along line 6—6 of Figure 5.

Figure 7 is a sectional view taken along line 7—7 of Figure 5.

Figure 8 is a fragmentary section taken along line 8—8 of Figure 5.

Figure 1:
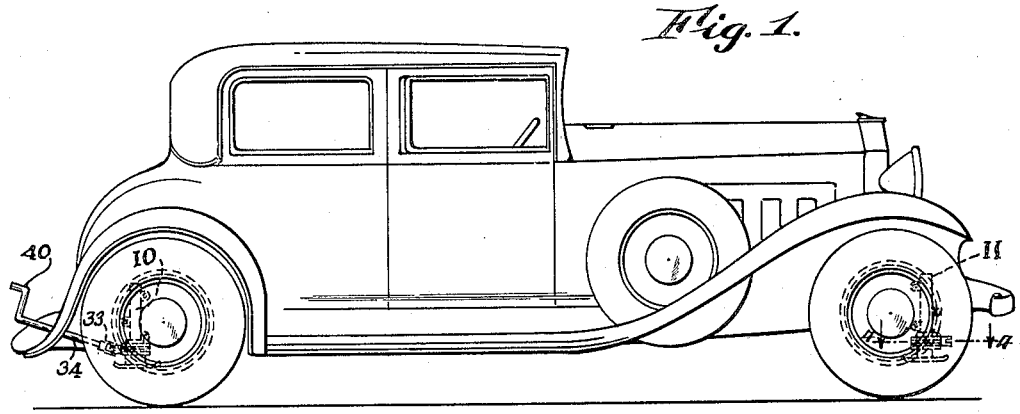
Figure 1 is a side elevation of an automobile showing jacks applied thereto embodying features of the invention.
Figure 2:
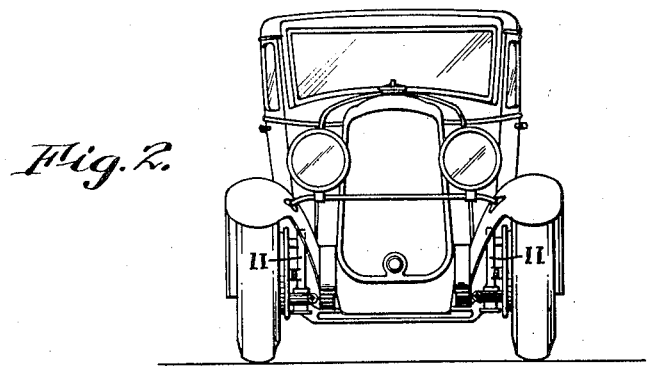
Figure 2 is a front view of the automobile.

As illustrated, the jacks are secured to the vehicle in close proximity to the wheels with which they are associated in order that they may be accommodated beneath the fenders of the wheels. As best shown in Figure 1, the jacks 10 for the rear wheels are located behind the rear axle housing while the jacks 11 for the front wheels are located in front of the front axle. In accordance with the invention each jack is permanently attached to the stationary plate 12 (Figure 5) of the brake housing of the associated wheel, the plate 12 co-operating with the brake drum 13 of the wheel in the conventional manner.

The jacks 10, as illustrated, include a tubular housing 14 which is secured in inverted position to the plate 12 by arms 15, the latter preferably being formed integrally with the housing and being provided with ears 16 by which the housing is secured to the plate 12. At its lower end the housing 14, which is preferably rectangular in cross-section, is flared as at 17 to provide a chamber 17a, the side of the flared portion adjacent the plate 12 being formed to provide a boss 18 which abuts the plate 12. The arms 15 and the boss 18 support the housing 14 in spaced relation to the plate 12 thereby to provide sufficient clearance for the foot 19 of the lifting member 20.

The lifting member is formed with a stem 21 which is substantially rectangular in cross section and which is threaded on its opposite sides as at 22 throughout the greater portion of its length. The stem 20 when in its inoperative position is, for the most part, enclosed within the housing 14. In order to move the lifting member to and from its operative position an internally threaded gear 23 is arranged in the chamber 17a. The gear 23 engages the threaded portions 22 of the lifting member and the latter, while being held against angular movement, is moved in the direction of its length upon rotation of the said gear. In order to reduce wearing between the parts a thrust bearing 24 is preferably arranged in the chamber 17a at the upper side of the gear 23. The said gear is formed externally with teeth 25 which cooperate with a worm 26, the latter being carried by the flared portion 17 of the housing 14.

A cover member 27 is employed in connection with the housing 14. The said member is formed with a flared end which fits conformably against the flared end 17 of the member 14. The flared ends of the members 14 and 27 are provided with co-operating pairs of ears 29, whereby the two members may be secured together by suitable fastening means. The cover member 27 carries a telescoping skirt 30 which is suitably connected at its upper end to a neck 28a formed or provided on the cover member 27 and which is connected at its lower end to the foot 19 of the lifting member. As the latter, therefore, is moved to and from its operative position the skirt 30 is extended and collapsed, whereby to seal the operating mechanism at all times against the action of dirt and water.

Figure 3:
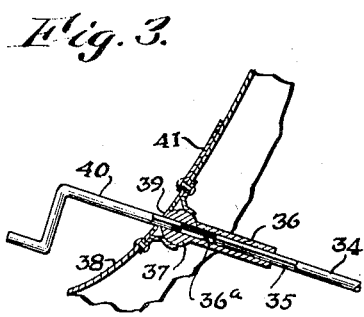
Figure 3 is a fragmentary view of a part of the operating mechanism of the jack.
Figure 4:
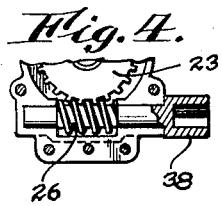
Figure 4 is an enlarged fragmentary section along line 4—4 of Figure 1.

In order to facilitate operation of the rear jacks 10 the worm 26 is preferably connected by a universal joint 33 (Figures 1 and 7) to an operating rod 34. The latter is provided with a squared end 35 (Figure 3) which fits in the end of a passage 36a formed in a tubular element 36, the passage 36a preferably being of rectangular cross section. The said element is formed with a ball-shaped end 37 by which it is suitably secured for universal movement to the fender 38 of the wheel. It will be apparent that with the construction described relative movement between the vehicle body, and hence the fender 38, and the brake housing plate 12 by which the jack is carried is permitted. In other words, the squared end 35 of the rod 34 is adapted to slide back and forth in the passage 36a to permit relative movement between the fender 38 and the brake housing of the wheel. The fender 38 is formed with an opening 39 through which the end of a crank 40 may be inserted into the open end of the passage 36a, whereby the rod 34 may be rotated to operate the jack in the required manner. The opening 39 may be normally closed by a plate 41 which is carried by the fender 38 and which may be moved from over the opening when access to the passage 36a is desired. As the front jacks 11 are more accessible, the use of a rod similar to the rod 34 is unnecessary. Hence in the case of the front jacks the worm 26 is formed with a short extension 38 which is formed for direct co-operation with the crank 40. It is to be understood, however, that the front wheel jacks may be operated in the manner described in connection with the rear wheel jacks, if this is preferred.

From the foregoing it will be apparent that owing to the manner in which it is secured to the vehicle the possibility of the jack shifting from its operative position is minimized. The jack has the further advantages that when inoperative it is located out of the way of possible road obstructions while the parts thereof are sealed against the action of dirt and the elements.

I claim as my invention:

1. The combination with the brake casing of a vehicle wheel, said casing having a stationary part, of a jack for lifting said wheel, said jack including a housing, means for rigidly securing said housing to said part, said means including laterally extending lugs which space said housing from said part, a lifting member slidably mounted in said housing and means for moving said lifting member to and from its operative position.

2. The combination with the brake casing of a vehicle wheel, said casing having a stationary part, of a jack for lifting said wheel, said jack including a tubular housing, means at spaced intervals along said housing for rigidly securing said housing to said part, a lifting member formed with a stem which is normally enclosed in said housing and means including said stem for moving said lifting member to and from its operative position.

3. The combination with the brake casing of a vehicle wheel, said casing having a stationary part, of a jack for lifting said wheel, said jack including a tubular housing, means for rigidly securing said housing adjacent its opposite ends to said part, a lifting member provided with a threaded stem which is normally enclosed in said housing and means including said stem for moving said lifting member to and from its operative position.

4. The combination with the brake casing of a vehicle wheel, said casing having a stationary part, of a jack for lifting said wheel, said jack including a tubular housing which is enlarged at its lower end and which is provided with a body having a passageway substantially rectangular in cross-section formed therein, means for rigidly securing the enlarged end of said housing against said part, a lifting member formed with a stem which is substantially rectangular in cross section and which is threaded on two sides, said stem fitting in said passageway and being held against rotation by the walls of said body, a worm gear, a second internally threaded gear which is adapted to co-operate with the threads on said stem and which is formed with external teeth which cooperate with said worm gear and means for operating said worm gear to move said lifting member to and from its operative position, both of said gears being located in the enlarged end of said housing.

5. The combination with the brake casing of a vehicle wheel, said casing having a stationary part, of a jack for lifting said wheel, said jack including a tubular housing which is enlarged at its lower end to provide a chamber and which is provided with a body having a passageway substantially rectangular in cross-section formed therein, means for rigidly securing the enlarged end of said housing against said part, said means including lateral projections which are carried by said housing, a lifting member formed with a stem which is substantially rectangular in cross-section and which fits in said passageway, the walls of said body holding said stem against rotation, said stem having teeth formed thereon and being provided at one end with a ground engaging portion, a gear arranged in said chamber, said gear having internal teeth which co-operate with said stem, said gear having external teeth formed thereon, a worm gear cooperating with said external teeth and means for operating said worm gear to move said member to and from its operative position.

6. The combination with the brake casing of a vehicle wheel, said casing having a stationary part, of a jack for lifting said wheel, said jack including a housing, means for rigidly securing said housing to said part, said means being adapted to support said housing in spaced relation to said part, a lifting member slidably mounted in said housing and means for moving said lifting member to and from its operative position.

7. The combination with the brake casing of a vehicle wheel, said casing having a stationary part, of a jack for lifting said wheel, said jack including a tubular housing, means for rigidly securing said housing to said part, a lifting member provided with a threaded stem which is normally enclosed in said housing having a ground engaging head which extends below said housing, means including said stem for moving said lifting member to and from its operative position and a collapsible shield surrounding said stem and connected at one end to said housing and at its other end to said ground engaging head, said shield being adapted to protect the stem from the elements and dirt.

FREDERICK H. SMITH.